United States Patent [19]
Nylund

[11] 3,784,350
[45] Jan. 8, 1974

[54] APPARATUS FOR HARDENING WINDING INSULATION

[75] Inventor: Knut Nylund, Zurich, Switzerland

[73] Assignee: Maschinenfabrik Oerlikon, Zurich, Switzerland

[22] Filed: Sept. 13, 1971

[21] Appl. No.: 179,978

Related U.S. Application Data
[63] Continuation of Ser. No. 792,544, Jan. 21, 1969, abandoned.

[52] U.S. Cl. .............................................. 425/445
[51] Int. Cl. ............................................. B29h 3/00
[58] Field of Search ............... 425/174.4, 445, 392; 264/27, 104, 105

[56] References Cited
UNITED STATES PATENTS

| | | | |
|---|---|---|---|
| 2,827,661 | 3/1958 | Kohorn | 425/174.6 |
| 3,254,143 | 5/1966 | Heitman | 264/105 X |
| 2,695,853 | 11/1954 | Forfeit | 264/27 X |
| 2,373,816 | 4/1945 | DeRoche et al. | 425/445 X |

Primary Examiner—H. A. Kilby, Jr.
Attorney—Toren & McGeady

[57] ABSTRACT

The hardening of winding insulation containing thermosetting plastics where deformation of the winding coil is a factor, is accomplished by variably heating the winding along its length in accordance with the different mechanical or electrical characteristics required in the winding. A portion of the winding insulation can be hardened uniformly in a heated mold with the remainder being heated by variably spaced heater bands wrapped around aluminum foil enclosing the winding insulation.

5 Claims, 3 Drawing Figures

PATENTED JAN 8 1974 3,784,350

APPARATUS FOR HARDENING WINDING INSULATION

This is a continuation of application Ser. No. 792,544 filed Jan. 21, 1969, now abandoned.

SUMMARY OF THE INVENTION

The present invention is directed to the hardening of winding insulation and, moare particularly, it is directed to an arrangement for variably hardening the winding insulation along its length.

In the production of winding insulation having high mechanical, thermal and dielectrical qualities, thermosetting plastics, such as epoxy or polyester resins, are used as the binders and impregnating agents. The winding insulation surrounding the electrical conductor consists, as is known, of a base of mica fragments or mica fleece into which the binder or impregnating agent is incorporated. With the insulation placed about the conductor the winding is calibrated under the action of heat and pressure in molds or presses and is hardened into a solid unit.

In introducing the windings of electrical machines into the slots of laminated bodies, the winding coils or rods must frequently be deformed. When conventional thermoplastic insulating materials are used such deformation can be achieved in a simple manner by moderately heating the coils. However, when thermosetting synthetic resins are used such a method is no longer possible. In windings containing thermosetting synthetic resin insulating materials the deformation tends to cause buckling, cracking or rupture at the highly stressed portions of the insulated windings.

Therefore, the primary object of the present invention is to permit deformation in windings for electrical machines whose insulation contains thermosetting synthetic resins without damaging the insulation.

Another object of the invention is to provide an arrangement for variably heating the winding insulation along its length.

Still another object of the invention is to employ heating means which will permit localized heating of the winding insulation.

Therefore, in accordance with the present invention, heating means are provided along the length of the winding insulation to afford a varying degree of hardening of the insulation in accordance with the mechanical and electrical charateristics required at particular points on the winding.

The various features of novelty which characterize the invention are pointed out with particularity in the claims annexed to and forming a part of this specification. For better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
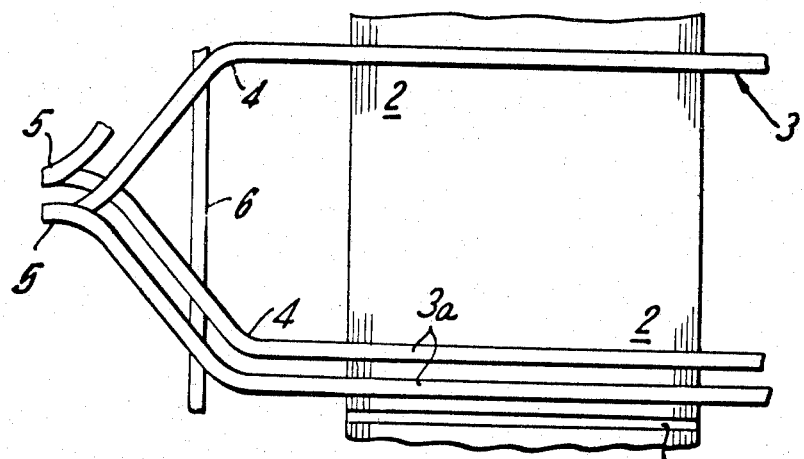
FIG. 1 is a partial representation of a bundle of laminations for an electrical machine with windings and a support arrangement for the windings.

In FIG. 1, slots 1 are formed in a bundle of laminated sheets 2 for an electrical machine. Windings 3 have a leg 3a extending through the slots 1 in the laminated sheets 2 and the sections of the windings extending from the bundle of sheets comprise a bend section 4 and an offset section 5. The winding is secured in a known manner on a support arrangement 6 such as a supporting ring or a similar apparatus.

Figure 2:
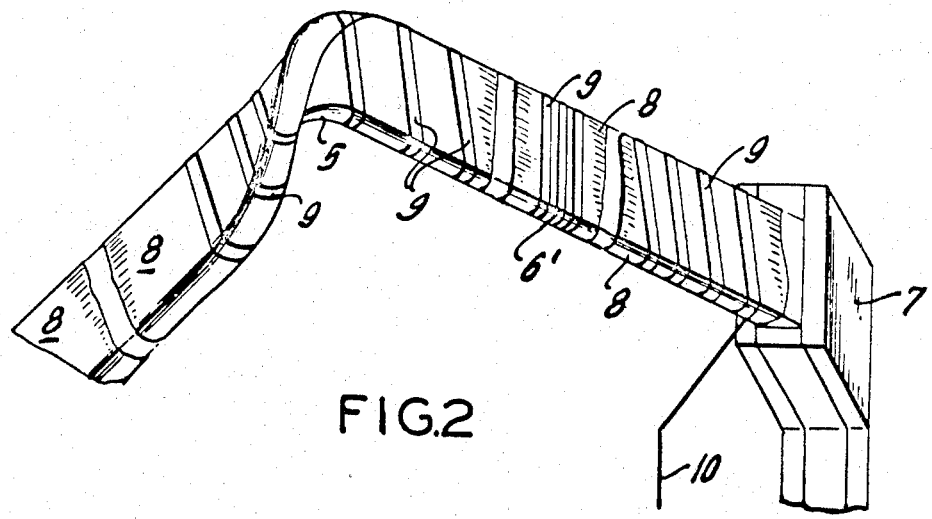
FIG. 2 is a partial perspective view of a compression mold and of a heating arrangement on the end of a winding section.

In FIG. 2 the offset section 5 of the winding is shown extending outwardly from a mold 7 with individual aluminum foils 8 disposed along the winding and electrical heater bands 9 wound about the exterior of the aluminum foils. The heater bands 9 are connected to a source of voltage by means of a terminal 10.

Figure 3:
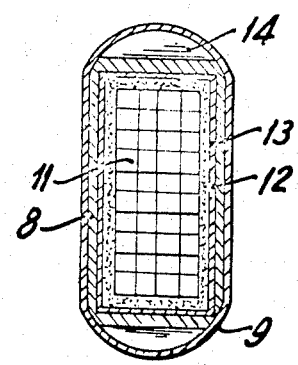
FIG. 3 is a sectional view through the winding.

In FIG. 3 the cross section of the winding 3 is indicated containing a copper coil 11 surrounded by insulation 12. The insulation consists preferably of either dry or preimpregnated mica strips. If dry mica strips are used the windings insulated by such mica strips must be subjected to a vacuum treatment and pressure impregnation with solvent-free synthetic resins before the calibration and hardening of the windings are effected. On the other hand, when preimpregnated mica strips are used the calibration and the hardening can be performed immediately. Laterally enclosing the insulation are clamping bars or hoops 13. Enclosing the insulation 12 and the hoops 13 are the aluminum foils 8 and at the upper and lower surfaces of the winding, as shown in FIG. 3, aluminum beads 14 are provided forming a continuation of the aluminum foils. Wrapped about the exterior of the winding, contacting the aluminum foils and beads, are electric heater strips or bands 9. The aluminum beads 14 have a segment shaped cross section with their rounded surfaces directed outwardly to prevent any sharp bends in the heater bands as they are wrapped about the exterior of the winding. Further, the hoops 13 are of the shrunk-on type and they prevent swelling of the winding insulation during the hardening process.

In FIG. 2, the mold 7 encloses both the leg 3a of the winding 3 supported in the slots 1 of the laminated sheets 2 and its bend section 4. Within the mold the winding is heated in a known manner, such as by steam or electric heating and then it is calibrated and completely hardened. The offset section 5 of the winding is surrounded by a plurality of individual aluminum foils 8 on which the electric heater bands 9 are wound at a varying pitch along the length of the winding. Where the heater bands 9 are arranged in side-by-side or in overlapping relationship the input heating effect to that portion of the winding is greater. Since tha aluminum foils 8 are not mechanically connected it is possible to obtain localization of the heat developed by the heater bands 9. Consequently, it is possible to effect a varying degree of hardening within the winding depending on the mechanical and electrical characteristics required in the particular sections of the winding. Thus, for example, the heater bands 9 are wound very closely on the section 6' of the winding which is secured on the supporting arrangement 6 and located between the band section 4 and the offset section 5 of the winding to achieve a degree of hardening corresponding to the stress which is developed at that particular location. At other points along the length of the winding the impregnating agent or binder is merely jelled due to the characteristics required in those locations. By hardening the winding insulation in this manner the assembly of the winding is made easy and any damage to the insulation is avoided. After the winding has been assembled in the electrical machine and necessary stress tests have been completed, the insulation is rehardened in a suitable furnace, or by means of the heater bands, or by employing the heat developed by the current in the copper coil or rod within the winding.

What is claimed is:

1. Apparatus for hardening winding insulation which contains thermosetting synthetic resins comprising a longitudinally extending heated mold for accommodating a portion of the winding, metal foils arranged along the surface of the winding which is located exteriorly of said heated mold, heater bands wrapped around said metal foils, said heater bands arranged in a varying pitch along the length of the winding located exteriorly of said mold, and said metal foils comprise separate non-connected sections of metal foil.

2. Apparatus, as set forth in claim 1, wherein said metal foil is formed of aluminum.

3. Apparatus, as set forth in claim 2, wherein aluminum beads positioned along the surfaces of the windings for avoiding sharp bends in applying said heater bands about the winding.

4. Apparatus, as set forth in claim 3, wherein said aluminum beads having a segment shaped cross sectional configuration with the rectilinear portion thereof contacting the exterior of the winding and the curvilinear portion thereof supporting said heater bands.

5. Apparatus, as set forth in claim 1, wherein hoops being arranged about the exterior of the winding insulation and being located interiorly of said metal foils on the exterior of the winding.

* * * * *

UNITED STATES PATENT OFFICE
CERTIFICATE OF CORRECTION

Patent No. 3,784,350　　　　　　　　　Dated January 8, 1974

Inventor(s) Knut Nylund

It is certified that error appears in the above-identified patent and that said Letters Patent are hereby corrected as shown below:

In the heading of the patent, insert

--[30]　Foreign Application Priority Data

February 7, 1968 Switzerland...........2072/68--

Signed and sealed this 14th day of May 1974.

(SEAL)
Attest:

EDWARD M.FLETCHER,JR.　　　　　　C. MARSHALL DANN
Attesting Officer　　　　　　　　Commissioner of Patents